(12) United States Patent
Stanhope et al.

(10) Patent No.: US 10,980,166 B2
(45) Date of Patent: Apr. 20, 2021

(54) SYSTEM AND METHOD FOR PRE-EMPTIVELY ADJUSTING MACHINE PARAMETERS BASED ON PREDICTED FIELD CONDITIONS

(71) Applicant: CNH Industrial America LLC, New Holland, PA (US)

(72) Inventors: Trevor Stanhope, Darien, IL (US); Christopher Schoeny, Yorkville, IL (US); Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 197 days.

(21) Appl. No.: 16/195,981

(22) Filed: Nov. 20, 2018

(65) Prior Publication Data

US 2020/0156470 A1 May 21, 2020

(51) Int. Cl.
*A01B 79/02* (2006.01)
*A01C 7/08* (2006.01)
(Continued)

(52) U.S. Cl.
CPC .......... *A01B 79/005* (2013.01); *A01B 69/008* (2013.01); *A01B 79/02* (2013.01);
(Continued)

(58) Field of Classification Search
CPC ..... A01B 69/008; A01B 79/005; A01B 79/02; A01D 4/127; A01D 41/1274;
(Continued)

(56) References Cited

U.S. PATENT DOCUMENTS

| 4,487,002 A | * | 12/1984 | Kruse | ................ A01D 41/1274 460/6 |
| 5,598,794 A | * | 2/1997 | Harms | ................... A01C 7/102 111/177 |

(Continued)

FOREIGN PATENT DOCUMENTS

| DE | 19528663 A1 | * | 2/1997 | ........... E01C 19/004 |
| DE | 1995128663 | | 2/1997 | |

(Continued)

OTHER PUBLICATIONS

EPO machine translation of DE 19528663 A1 (original DE document published Feb. 7, 1997) (Year: 1997).*

(Continued)

*Primary Examiner* — Rachid Bendidi
*Assistant Examiner* — David A Testardi
(74) *Attorney, Agent, or Firm* — Rebecca L. Henkel; Rickard K. DeMille

(57) ABSTRACT

In one aspect, a method for pre-emptively adjusting machine parameters based on predicted field conditions may include monitoring an operating parameter of as the agricultural machine makes a first pass across a field. The method may also include initiating active adjustments of the travel speed of the machine based on the operating parameter as the machine makes the first pass. Furthermore, the method may include generating a map based on the travel speed and the operating parameter that included efficiency zones associated with one or more travel speeds. Moreover, the method may include determining predicted efficiency zones for an adjacent second swath within the field based on efficiency zones of the first swath within the field map. Additionally, the method may include pre-emptively initiating adjustments of the travel speed as the machine makes a second (Continued)

pass across the field based on the efficiency parameter for each predicted efficiency zone.

19 Claims, 6 Drawing Sheets

(51) Int. Cl.
  *A01B 79/00* (2006.01)
  *B60K 31/00* (2006.01)
  *A01B 69/04* (2006.01)
  *A01C 21/00* (2006.01)
(52) U.S. Cl.
  CPC .............. *A01C 7/08* (2013.01); *A01C 21/005* (2013.01); *B60K 31/00* (2013.01); *B60Y 2200/221* (2013.01); *B60Y 2400/301* (2013.01); *B60Y 2400/303* (2013.01)
(58) Field of Classification Search
  CPC .. A01D 41/1278; A01D 41/127; G06Q 50/02; G05D 1/0223; G05D 1/0274; G05D 2201/0201; A01C 5/066; A01C 5/068; A01C 7/04; A01C 7/044; A01C 7/08; A01C 21/005; B60K 31/00
  See application file for complete search history.

(56) References Cited

U.S. PATENT DOCUMENTS

| | | | | |
|---|---|---|---|---|
| 5,666,793 | A | * | 9/1997 | Bottinger .............. A01B 79/005 460/1 |
| 5,995,895 | A | * | 11/1999 | Watt ................... B60K 31/0058 701/50 |
| 6,085,135 | A | * | 7/2000 | Steckel ................ A01B 79/005 340/988 |
| 6,349,775 | B1 | * | 2/2002 | van der Lely ....... A01B 79/005 172/111 |
| 7,308,326 | B2 | | 12/2007 | Maertens et al. |
| 7,921,626 | B2 | * | 4/2011 | Maertens ........... A01D 41/1276 56/10.2 R |
| 9,008,918 | B2 | | 4/2015 | Missotten et al. |
| 9,098,085 | B2 | | 8/2015 | Aznavorian et al. |
| 9,357,709 | B2 | | 6/2016 | Waechter et al. |
| 9,511,668 | B2 | | 12/2016 | Johansson et al. |
| 9,596,803 | B2 | | 3/2017 | Wendte et al. |
| 9,664,249 | B2 | | 5/2017 | Kowalchuk |
| 2002/0137556 | A1 | * | 9/2002 | Coers .................. A01D 41/127 460/7 |
| 2003/0066277 | A1 | * | 4/2003 | Behnke ................ A01D 41/127 56/10.2 R |
| 2010/0018726 | A1 | * | 1/2010 | Chiocco ............... A01B 69/008 172/1 |
| 2013/0179043 | A1 | * | 7/2013 | Byttebier ............... B60K 31/00 701/50 |
| 2014/0041563 | A1 | * | 2/2014 | Henry ..................... A01C 5/062 111/139 |
| 2014/0059988 | A1 | * | 3/2014 | Diekhans ............. A01D 43/085 56/10.2 A |
| 2014/0277961 | A1 | | 9/2014 | Blank et al. |
| 2014/0338298 | A1 | * | 11/2014 | Jung .................... A01D 41/127 56/10.2 R |
| 2015/0242799 | A1 | * | 8/2015 | Seki ................. G06Q 10/06395 705/7.15 |
| 2015/0264863 | A1 | * | 9/2015 | Muench .................... G06N 5/04 701/50 |
| 2015/0305238 | A1 | * | 10/2015 | Klausmann .......... A01D 41/127 701/50 |
| 2016/0125331 | A1 | | 5/2016 | Vollmar et al. |
| 2016/0319935 | A1 | * | 11/2016 | Bittner .................... F16H 63/42 |
| 2016/0334798 | A1 | * | 11/2016 | Foster .................. G05D 1/0274 |
| 2017/0006759 | A1 | | 1/2017 | Adamchuk et al. |
| 2017/0094894 | A1 | | 4/2017 | Heim et al. |
| 2017/0188505 | A1 | | 7/2017 | Potier et al. |
| 2017/0367253 | A1 | * | 12/2017 | Engel .................... A01C 21/005 |
| 2018/0168094 | A1 | | 6/2018 | Koch ..................... G01N 33/24 |
| 2018/0196441 | A1 | | 7/2018 | Muench ............ A01D 41/1274 |
| 2018/0208058 | A1 | * | 7/2018 | Czapka .................. B60K 31/00 |
| 2018/0267553 | A1 | * | 9/2018 | Ebertseder ........... A01B 69/004 |
| 2018/0279599 | A1 | * | 10/2018 | Struve ................. G09B 29/106 |
| 2018/0359904 | A1 | * | 12/2018 | Foster .............. G06Q 10/047 |
| 2018/0373257 | A1 | * | 12/2018 | Runde .................. A01B 69/008 |
| 2019/0230845 | A1 | * | 8/2019 | Buchner .............. A01B 69/008 |
| 2020/0015416 | A1 | * | 1/2020 | Barther ..................... G06T 7/97 |
| 2020/0154639 | A1 | * | 5/2020 | Takahara ............. G07C 5/0841 |

FOREIGN PATENT DOCUMENTS

| | | | |
|---|---|---|---|
| JP | 05153819 A | * | 6/1993 |
| JP | 08205635 A | * | 8/1996 |
| JP | 10113016 A | * | 5/1998 |
| JP | 2004180629 A | * | 7/2004 |

OTHER PUBLICATIONS

Frédéric Françis René-Laforest, Real-Time Variable Control Technologies for Precision Agriculture, Department of Bioresource Engineering, Macdonald Campus of McGill University, Apr. 1, 2015, 75 pages.

* cited by examiner

```
                                    ┌─────────────────────────────────────────────────────────────────┐
                          200 ┐      │ MONITOR AN OPERATING PARAMETER ASSOCIATED WITH AN AGRICULTURAL │
                              └──┐   │ MACHINE AS THE AGRICULTURAL MACHINE MAKES A FIRST PASS ACROSS   │──202
                                     │ A FIELD TO PERFORM AN AGRICULTURAL OPERATION ALONG A FIRST     │
                                     │ SWATH WITHIN THE FIELD                                          │
                                     └─────────────────────────────────────────────────────────────────┘
                                                                     │
                                                                     ▼
                                     ┌─────────────────────────────────────────────────────────────────┐
                                     │ INITIATE ACTIVE ADJUSTMENTS OF THE TRAVEL SPEED OF THE          │
                                     │ AGRICULTURAL MACHINE BASED ON THE MONITORED OPERATING          │──204
                                     │ PARAMETER AS THE AGRICULTURAL MACHINE MAKES THE FIRST PASS     │
                                     │ ACROSS THE FIELD ALONG THE FIRST SWATH                         │
                                     └─────────────────────────────────────────────────────────────────┘
                                                                     │
                                                                     ▼
                                     ┌─────────────────────────────────────────────────────────────────┐
                                     │ GENERATE A FIELD MAP BASED ON THE TRAVEL SPEED OF THE          │
                                     │ AGRICULTURAL MACHINE AND THE MONITORED OPERATING PARAMETER     │──206
                                     │ THAT INCLUDES A PLURALITY OF EFFICIENCY ZONES ACROSS THE FIRST │
                                     │ SWATH OF THE FIELD                                              │
                                     └─────────────────────────────────────────────────────────────────┘
                                                                     │
                                                                     ▼
                                     ┌─────────────────────────────────────────────────────────────────┐
                                     │ DETERMINE PREDICTED EFFICIENCY ZONES FOR AN ADJACENT SECOND    │
                                     │ SWATH WITHIN THE FIELD BASED ON THE IDENTIFIED EFFICIENCY      │──208
                                     │ ZONES OF THE FIRST SWATH WITHIN THE FIELD MAP                  │
                                     └─────────────────────────────────────────────────────────────────┘
                                                                     │
                                                                     ▼
                                     ┌─────────────────────────────────────────────────────────────────┐
                                     │ PRE-EMPTIVELY INITIATE ADJUSTMENTS OF THE TRAVEL SPEED OF THE  │
                                     │ AGRICULTURAL MACHINE AS THE AGRICULTURAL MACHINE MAKES A       │
                                     │ SECOND PASS ACROSS THE FIELD TO PERFORM THE AGRICULTURAL       │──210
                                     │ OPERATION ALONG EACH PREDICTED EFFICIENCY ZONE WITHIN THE      │
                                     │ ADJACENT SECOND SWATH BASED ON ONE OR MORE RECORDED TRAVEL    │
                                     │ SPEEDS FOR EACH PREDICTED EFFICIENCY ZONE                      │
                                     └─────────────────────────────────────────────────────────────────┘
```

FIG. 6

SYSTEM AND METHOD FOR PRE-EMPTIVELY ADJUSTING MACHINE PARAMETERS BASED ON PREDICTED FIELD CONDITIONS

FIELD OF THE INVENTION

The present disclosure generally relates to systems and methods for adjusting operating parameters of an agricultural machine based on conditions within a field and, more particularly, to a system and method for pre-emptively adjusting the travel speed of an agricultural machine based on predicted field conditions.

BACKGROUND OF THE INVENTION

Agricultural implements, such as planter, seeders, tillage implements, and/or the like, are typically configured to perform an agricultural operation within a field, such as a planting/seeding operation, a tillage operation, and/or the like. When performing such agricultural operations, it is desirable to be able to adjust the operation of the implement to account for variations in the field conditions that could potentially impact the effectiveness and/or efficiency of the operation. In this regard, sensor systems have been developed that allow a given field condition to be detected along the portion of the field across which the implement is currently traveling. Adjustments to the operation of the implement may then be made based on the detected field condition.

However, since such conventional sensor systems are only configured detect field conditions associated with the current portion of the field being traversed by the implement, any adjustments made to the operation of the implement are inherently reactive. As such, conventional systems are unable to respond adequately to sudden or immediate changes in the field condition being detected, which can lead to undesirable results associated with the effectiveness and/or efficiency of the corresponding agricultural operation.

Accordingly, a system and method for predicting field conditions associated with an adjacent swath within a field and making pre-emptive adjustments to the operation of an agricultural machine based on the predictive field conditions would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for pre-emptively adjusting machine parameters based on predicted field conditions. The method mayx include monitoring, with a computing device, an operating parameter associated with an agricultural machine as the agricultural machine makes a first pass across a field to perform an agricultural operation along a first swath within the field, with the operating parameter varying as a function of a travel speed of the agricultural machine and a field condition of the field. The method may also include initiating, with the computing device, active adjustments of the travel speed of the agricultural machine based on the monitored operating parameter as the agricultural machine makes the first pass across the field along the first swath. Furthermore, the method may include generating, with the computing device, a field map based on the travel speed of the agricultural machine and the monitored operating parameter that includes a plurality of efficiency zones across the first swath of the field. Each efficiency zone may be associated with one or more recorded travel speeds of the agricultural machine at which the monitored operating parameter is maintained within a predetermined range as the agricultural machine is traversed across such efficiency zone. Moreover, the method may include determining, with the computing device, predicted efficiency zones for an adjacent second swath within the field based on the identified efficiency zones of the first swath within the field map. Each predicted efficiency zone of the second swath being associated with the same one or more recorded travel speeds of the corresponding efficiency zone of the plurality of efficiency zones of the first swath. Additionally, the method may include pre-emptively initiating, with the computing device, adjustments of the travel speed of the agricultural machine as the agricultural machine makes a second pass across the field to perform the agricultural operation along each predicted efficiency zone within the adjacent second swath based on the one or more recorded travel speeds associated with each predicted efficiency zone.

In another aspect, the present subject matter is directed to a system for pre-emptively adjusting machine parameters based on predicted field conditions. The system may include an agricultural machine configured to perform an agricultural operation on a field as the agricultural machine is moved across the field. The system may also include a sensor configured to detect an operating parameter associated with the agricultural machine, with the operating parameter varying as a function of a travel speed of the agricultural machine and a field condition of the field. Furthermore, the system may include a controller communicatively coupled to the sensor. As such, the controller may be configured to monitor the operating parameter as the agricultural machine makes a first pass across the field to perform the agricultural operation along a first swath within the field based on data received from the sensor. The controller may also be configured to initiate active adjustments of the travel speed of the agricultural machine based on the monitored operating parameter as the agricultural machine makes the first pass across the field along the first swath. Moreover, the controller may be configured to generate a field map based on the travel speed of the agricultural machine and the monitored operating parameter that includes a plurality of efficiency zones across the first swath of the field. Each efficiency zone may be associated with one or more recorded travel speeds of the agricultural machine at which the monitored operating parameter is maintained within a predetermined range as the agricultural machine is traversed across such efficiency zone. Furthermore, the controller may be configured to determine predicted efficiency zones for an adjacent second swath within the field based on the identified efficiency zones of the first swath within the field map. Each predicted efficiency zone of the second swath being associated with the same one or more recorded travel speeds of a corresponding efficiency zone of the plurality of efficiency zones of the first swath. Additionally, the controller may be configured to pre-emptively initiate adjustments of the travel speed of the agricultural machine as the agricultural machine makes a second pass across the field to perform the agricultural operation along each predicted efficiency zone within the adjacent second swath based on the one or more recorded travel speeds associated with each predicted efficiency zone.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a flow diagram of one embodiment of a method for pre-emptively adjusting machine parameters based on predicted field conditions in accordance with aspects of the present subject matter.

Figure 1:
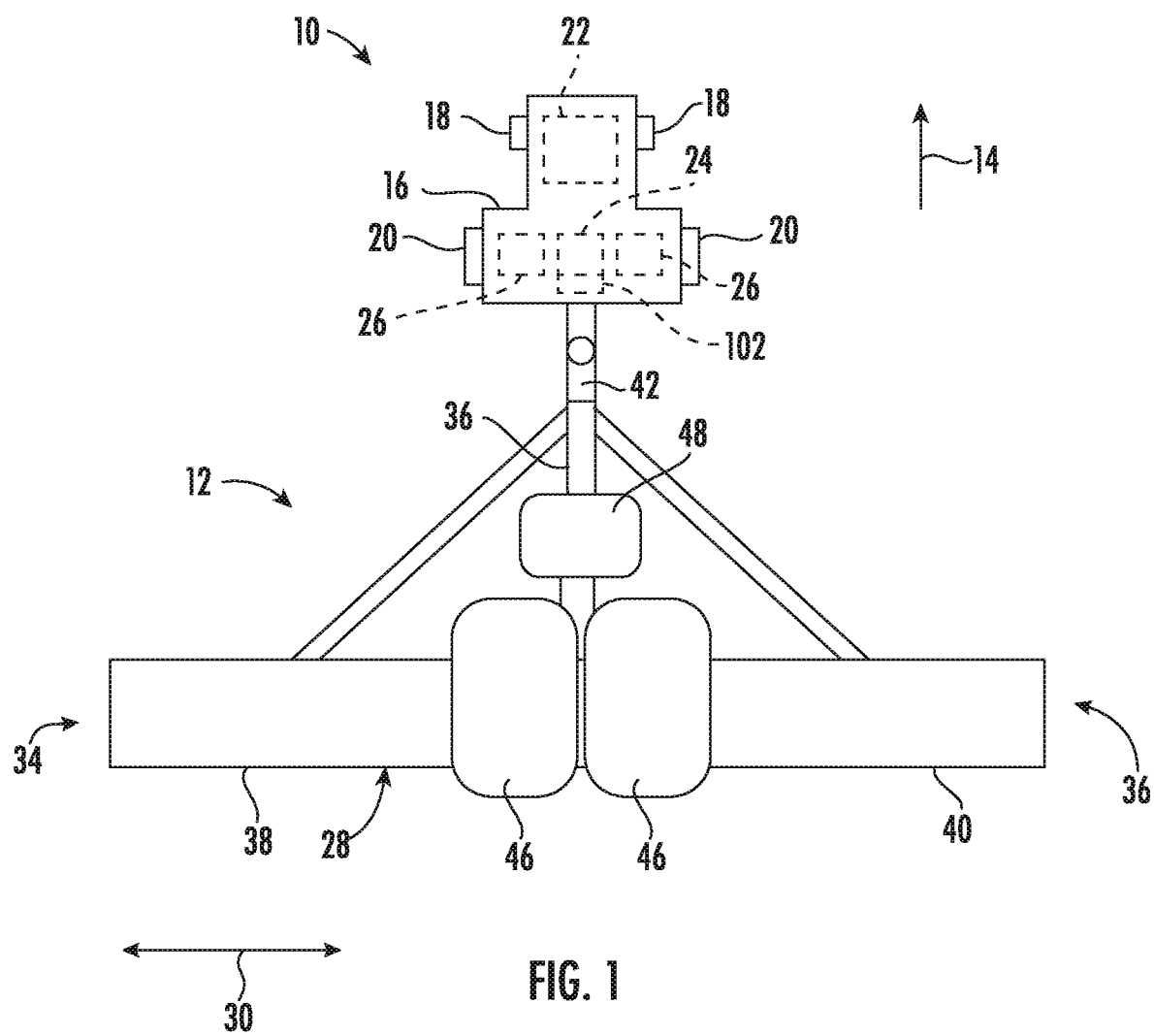
FIG. 1 illustrates a top view of one embodiment of an agricultural machine including an agricultural implement and an associated agricultural vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for pre-emptively adjusting agricultural machine operating parameters based on predicted field conditions. Specifically, in several embodiments, a controller of the disclosed system may be configured to monitor an operating parameter of an agricultural machine as the machine makes a first pass across a field to perform an agricultural operation along a first swath within the field. For example, in one embodiment, the operating parameter may be a ground contact metric indicative of whether a ground engaging tool(s) of the agricultural machine remains in contact with the ground as the machine moves across the field. As such, the controller may be configured to control the operation of the agricultural machine in a manner that actively adjusts the travel speed of the machine based on the monitored operating parameter as the machine makes the first pass along the first swath.

In accordance with aspects of the present subject matter, the controller may be configured to generate a field map based on the monitored operating parameter and a travel speed of the agricultural machine. Specifically, as the agricultural machine makes the first pass, the controller may be configured to monitor the operating parameter relative to a predetermined operating parameter range. The range may, for example, be selected to maintain contact between the ground engaging tool(s) of the agricultural machine and the soil within the field, while still maximizing efficiency of the agricultural operation. As such, the controller may be configured to record the travel speeds of the agricultural machine at which the monitored operating parameter is maintained within the predetermined range as the machine moves along the first pass. Thereafter, the controller may be configured to generate a field map that geo-locates the recorded travel speeds along the first swath, with significant variations in the travel speeds being identified within the field map as separate efficiency zones. Furthermore, the controller may be configured to determine predicted efficiency zones for an adjacent second swath within the field based on the identified efficiency zones of the first swath within the field map. For example, in one embodiment, the controller may be configured to project the identified efficiency zones for the first swath onto corresponding locations within the second swath. As such, each predicted efficiency zone of the second swath may be associated with the same travel speeds as the corresponding efficiency zone of the first swath.

Additionally, the controller may be configured to pre-emptively initiate adjustments of the travel speed of the agricultural machine as the machine makes a second pass across the field to perform the agricultural operation along the second swath. Specifically, in several embodiments, the controller may be configured to control the operation of the agricultural machine based on the predicted efficiency zones within the second swath as the machine makes the second pass. For example, in one embodiment, the controller may be configured to initiate active adjustments of the travel speed of the agricultural machine based on the travel speeds associated with each predicted efficiency zone such that the machine is traveling at one of the travel speeds associated with a given predicted efficiency zone when entering such zone. After the pre-emptive adjustments, the controller may be configured to continue monitoring the operating parameter and may initiate active adjustments of the travel speed based on the current operating parameter as the machine makes the second pass. It should be appreciated that any active adjustments made to the travel speed based on the current operating parameter may override the pre-emptive adjustments of the travel speed made based on the predicted efficiency zones.

Figure 2:
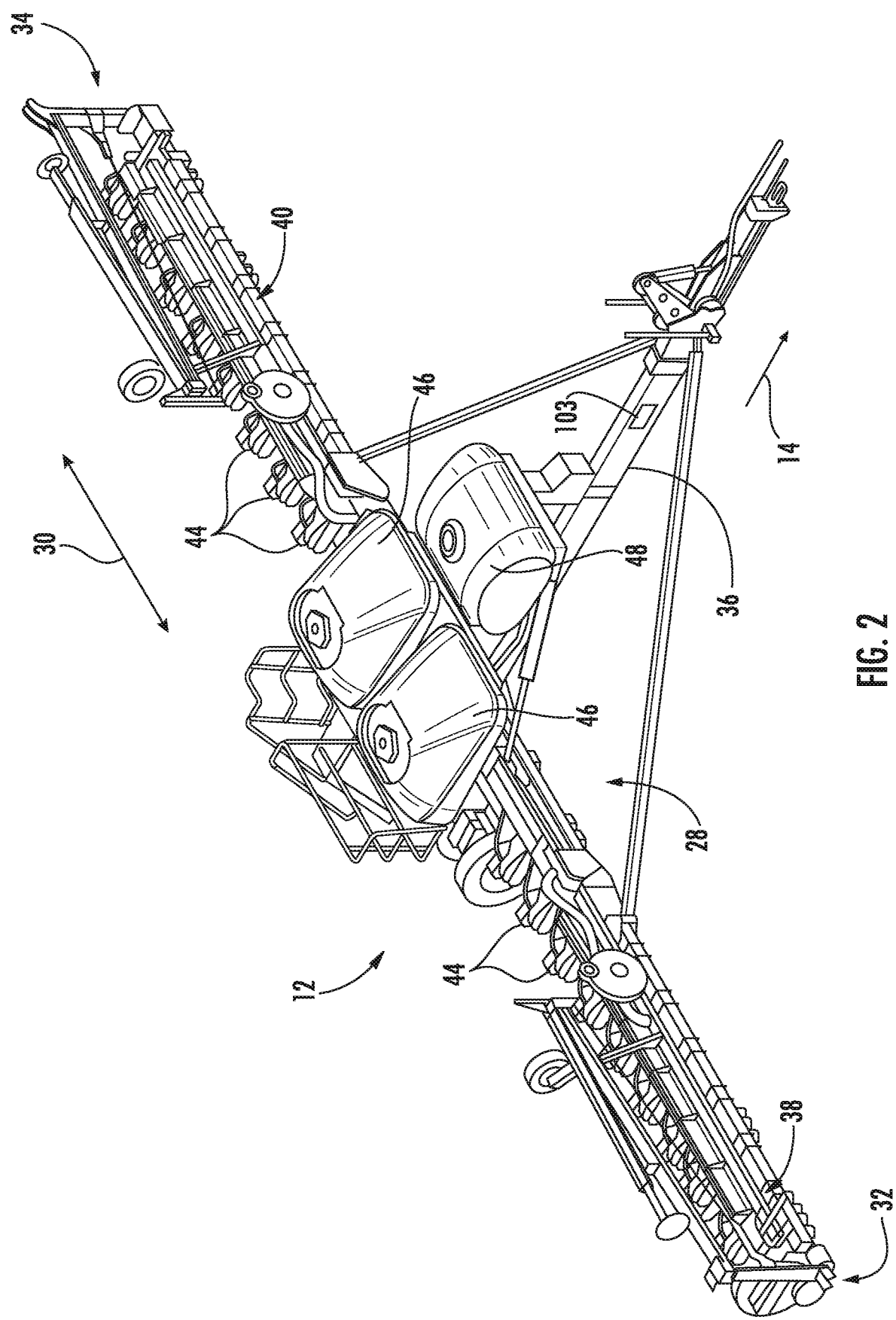
FIG. 2 illustrates a perspective view of the agricultural machine shown in FIG. 1, particularly illustrating various components of the agricultural implement in accordance with aspects of the present subject matter.

Referring now to the drawings, FIGS. 1 and 2 illustrate differing views of one embodiment of an agricultural machine in accordance with aspects of the present subject matter. Specifically, FIG. 1 illustrates a top view of the agricultural machine including an agricultural vehicle 10 and an associated agricultural implement 12. Additionally, FIG. 2 illustrates a perspective view of the agricultural machine, particularly illustrating various components of the implement 12.

In the illustrated embodiment, the agricultural machine corresponds to the combination of the agricultural vehicle 10 and the associated agricultural implement 12. As shown in FIGS. 1 and 2, the vehicle 10 corresponds to an agricultural tractor configured to tow the implement 12, namely a seed-planting implement (e.g., a planter), across a field in a direction of travel (e.g., as indicated by arrow 14 in FIG. 1). However, in other embodiments, the agricultural machine may correspond to any other suitable combination of agricultural vehicle (e.g., an agricultural harvester, a self-propelled sprayer, and/or the like) and agricultural implement (e.g., such as a tillage implement, seeder, fertilizer, sprayer (a towable sprayer or a spray boom of a self-propelled sprayer), mowers, and/or the like). In addition, it should be appreciated that, as used herein, the term "agricultural machine" may refer not only to combinations of agricultural implements and vehicles, but also to individual agricultural implements and/or vehicles.

As shown in FIG. 1, the vehicle 10 may include a frame or chassis 16 configured to support or couple to a plurality of components. For example, a pair of steerable front wheels 18 and a pair of driven rear wheels 20 may be coupled to the frame 16. The wheels 18, 20 may be configured to support the vehicle 10 relative to the ground and move the agricultural vehicle 10 in the direction of travel 14 across the field. However, it should be appreciated that, in alternative embodiments, the front wheels 18 may be driven in addition to or in lieu of the rear wheels 20. Additionally, it should be appreciated that, in further embodiments, the vehicle 10 may include track assemblies (not shown) in place of the front and/or rear wheels 18, 20.

Furthermore, the vehicle 10 may include one or more devices for adjusting the speed at which the vehicle/implement 10/12 moves across the field in the direction of travel 14. Specifically, in several embodiments, the vehicle 10 may include an engine 22 and a transmission 24 mounted on the frame 16. As is generally understood, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine power to the driven wheels 20. For example, increasing the power output by the engine 22 (e.g., by increasing the fuel flow to the engine 22) and/or shifting the transmission 24 into a higher gear may increase the speed at which the vehicle/implement 10/12 moves across the field. Conversely, decreasing the power output by the engine 22 (e.g., by decreasing the fuel flow to the engine 22) and/or shifting the transmission 24 into a lower gear may decrease the speed at which the vehicle/implement 10/12 moves across the field.

Additionally, the vehicle 10 may include one or more braking actuators 26 that, when activated, reduce the speed at which the vehicle/implement 10/12 moves across the field, such as by converting energy associated with the movement of the vehicle/implement 10/12 into heat. For example, in one embodiment, the braking actuator(s) 26 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, it should be appreciated that the braking actuator(s) 26 may correspond to any other suitable hydraulic, pneumatic, mechanical, and/or electrical component(s) configured to convert the rotation of the rotating element(s) into heat. Furthermore, although FIG. 1 illustrates one braking actuator 26 provided in operative association with each of the driven wheels 20, it should be appreciated that the agricultural vehicle 10 may include any other suitable number of braking actuators 26. For example, in one embodiment, the agricultural vehicle 10 may include one braking actuator 26 provided in operative association with each of the steerable wheels 18 in addition to or in lieu of the driven wheels 20. Additionally, in other embodiments, the implement 12 may include one or more braking actuators.

Moreover, in several embodiments, a travel speed sensor 102 may be provided in operative association with the vehicle 10. As such, the travel speed sensor 102 may be configured to detect a parameter associated with the travel speed or ground speed at which the agricultural vehicle/implement 10/12 moves across the field. For instance, in one embodiment, the speed sensor 102 may be configured as a Hall Effect sensor configured to detect the rotational speed of an output shaft of the transmission 24 of the vehicle 10. However, it should be appreciated that, in alternative embodiments, the speed sensor 102 may be configured as any suitable device for sensing or detecting the speed of the agricultural vehicle 10. For example, in one embodiment, the speed sensor 102 may be configured as a suitable satellite navigation positioning system, such as a GPS system. Additionally, in further embodiments, the speed sensor 102 may be provided in operative association with the implement 10.

Referring still to FIGS. 1 and 2, the implement 12 may include a frame or toolbar 28 configured to support and/or couple to one or more components of the implement 12. Specifically, in several embodiments, the toolbar 28 may extend along a lateral direction (e.g., as indicated by arrow 30 in FIG. 2) between a first side 32 of the implement 12 and a second side 34 of the implement 12. As shown, the toolbar 28 may include a center section 36 and a pair of wing sections 38, 40. In one embodiment, the wing sections 38, 40 may be pivotably coupled to the center section 36 in a manner that permits the wing sections 38, 40 to fold forward to reduce the lateral width of the implement 12, such as during storage or transportation of the implement 12 on a road. Furthermore, a tow bar 42 may be coupled to the center section 36 to allow the implement 12 to be towed by the vehicle 10. Additionally, as shown in FIG. 2, the wing sections 38, 40 may generally be configured to support a plurality of row units 44. As will be described below, each row unit 44 may be configured to deposit seeds at a desired depth beneath the soil surface and at a desired spacing as the implement 12 is towed by the vehicle 10, thereby establishing rows of planted seeds. In some embodiments, the bulk of the seeds to be planted may be stored in one or more hoppers or seed tanks 46 mounted on or otherwise supported by the toolbar 28. Thus, as seeds are planted by the row units 44, a pneumatic distribution system (not shown) may distribute additional seeds from the seed tanks 46 to the individual row units 42. Additionally, one or more fluid tanks 48 mounted on or otherwise supported by the toolbar 28 may store agricultural fluids, such as insecticides, herbicides, fungicides, fertilizers, and/or the like, which may be sprayed onto the seeds during planting.

It should be appreciated that, for purposes of illustration, only a portion of the row units 44 of the implement 12 have been shown in FIG. 2. In general, the implement 12 may include any number of row units 44, such as six, eight, twelve, sixteen, twenty-four, thirty-two, or thirty-six row units. In addition, it should be appreciated that the lateral spacing between row units 44 may be selected based on the type of crop being planted. For example, the row units 44 may be spaced approximately thirty inches from one another for planting corn, and approximately fifteen inches from one another for planting soybeans.

Additionally, as shown in FIG. 2, a location sensor 103 may be provided in operative association with the vehicle 10 and/or the implement 12. For instance, as shown in FIG. 2, the location sensor 103 is installed on or within the implement 12. However, in other embodiments, the location sensor 103 may be installed on or within the vehicle 10. In general, the location sensor 103 may be configured to determine the exact location of the vehicle 10 and/or the implement 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 103 may be transmitted to a controller(s) of the vehicle 10 and/or the implement 12 (e.g., in the form coordinates) and stored within the controller's memory for subsequent processing and/or analysis. For instance, based on the known dimensional configuration and/or relative positioning between the vehicle 10 and the implement 12, the determined location from the location sensor 103 may be used to geo-locate the implement 12 within the field. In addition, based on the known dimensional configuration and/or relative positioning between the implement 12 and each sensor installed on the implement 12, each sensor and/or its associated data may be geo-located within the field. Additionally, in one embodiment, the speed sensor 102 may be incorporated within or provided as part of the location sensor 103. However, in alternative embodiments, the speed and location sensors 102, 103 may correspond to separate stand-alone sensors.

Figure 3:
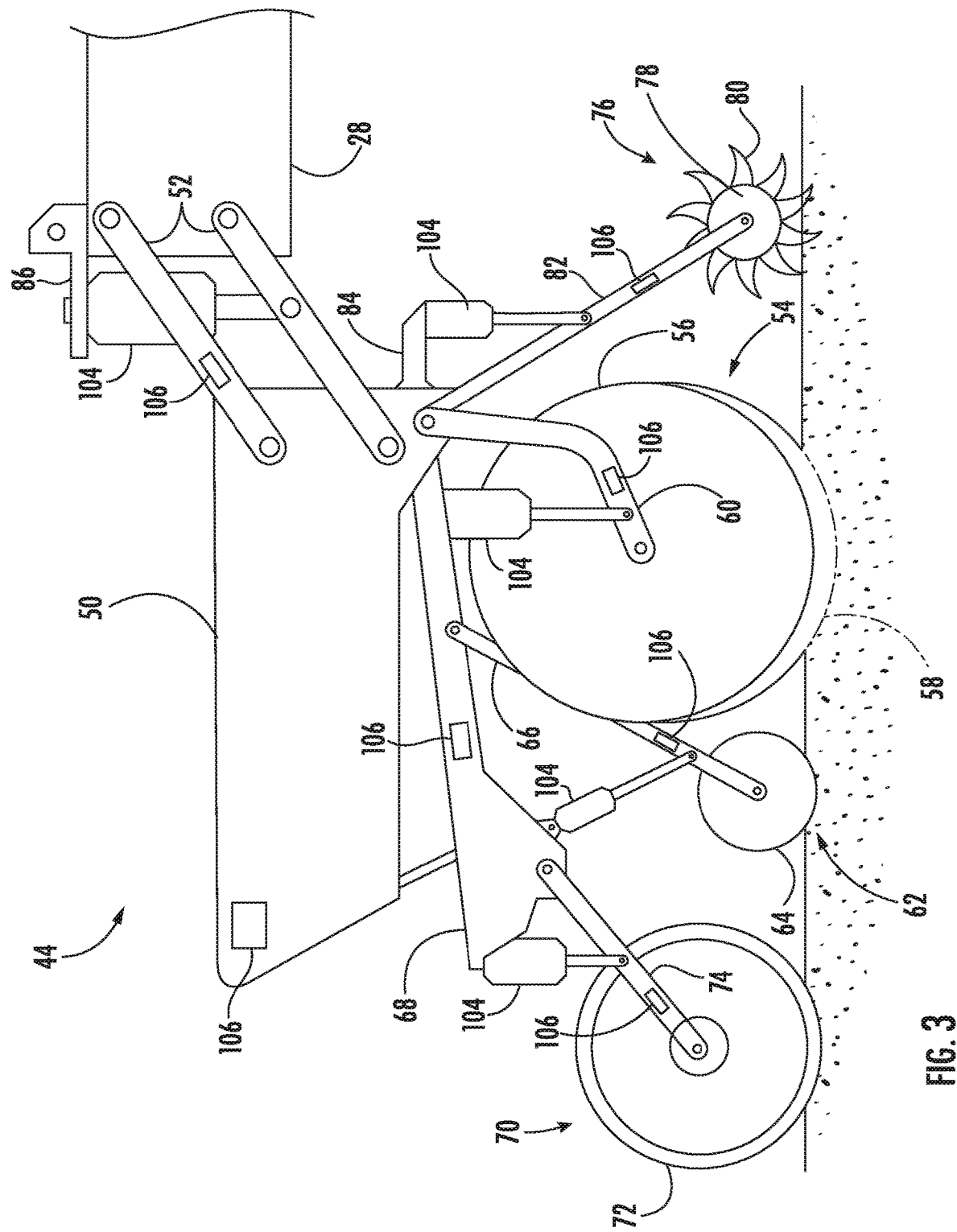
FIG. 3 illustrates a side view of one embodiment of a row unit suitable for use with an agricultural implement in accordance with aspects of the present subject matter, particularly illustrating one or more operating sensors installed on the row unit of the implement.

Referring now to FIG. 3, a side view of one embodiment of a row unit 44 is illustrated in accordance with aspects of the present subject matter. As shown, the row unit 44 may include a frame 50 adjustably coupled to the toolbar 28 by links 52. For example, one end of each link 52 may be pivotably coupled to the frame 50, while an opposed end of each link 52 may be pivotably coupled to the toolbar 28. In one embodiment, the links 52 may be parallel. However, it should be appreciated that, in alternative embodiments, the row unit 44 may be coupled to the toolbar 28 in any other suitable manner.

As shown in FIG. 3, the row unit 44 also includes a furrow opening assembly 54. For example, in one embodiment, the furrow opening assembly 54 may include a gauge wheel 56 and one or more disc openers 58 configured to excavate a furrow or trench in the soil. As is generally understood, the gauge wheel 56 may be configured to engage the top surface of the soil as the implement 12 is moved across the field. In this regard, the height of the disc opener(s) 58 may be adjusted with respect to the position of the gauge wheel 56 to set the desired depth of the furrow being excavated. Furthermore, the furrow opening assembly 54 may include a support arm 60 configured to adjustably couple the gauge wheel 56 and the disc opener(s) 58 to the frame 50. For example, one end of the support arm 60 may be pivotably coupled to the gauge wheel 56 and the disc opener(s) 58, while an opposed end of the support arm 60 may be pivotably coupled to the frame 50. However, it should be appreciated that, in alternative embodiments, the gauge wheel 56 and the disc opener(s) 58 may be coupled to the frame 50 in any other suitable manner.

Moreover, as shown, the row unit 44 may include a furrow closing assembly 62. Specifically, in several embodiments, the furrow closing assembly 62 may include a pair of closing discs 64 (only of which is shown) positioned relative to each other in a manner that permits soil to flow between the discs 64 as the implement 12 is being moved across the field. As such, the closing discs 64 may be configured to close the furrow after seeds have been deposited therein, such as by pushing the excavated soil into the furrow. Furthermore, the furrow closing assembly 62 may include a support arm 66 configured to adjustably couple the closing discs 64 to the frame assembly 22. For example, one end of the support arm 66 may be pivotably coupled to the closing discs 64, while an opposed end of the support arm 66 may be pivotably coupled to a chassis arm 68, which is, in turn, coupled to the frame 50. However, it should be appreciated that, in alternative embodiments, the closing discs 64 may be coupled to the frame 50 in any other suitable manner. Furthermore, it should be appreciated that, in alternative embodiments, the furrow closing assembly 62 may include any other suitable number of closing discs 64, such as one closing disc 64 or three or more closing discs 64.

Additionally, the row unit 44 may include a press wheel assembly 70. Specifically, in several embodiments, the press wheel assembly 70 may include a press wheel 72 configured to roll over the closed furrow to firm the soil over the seed and promote favorable seed-to-soil contact. Furthermore, the press wheel assembly 70 may include a support arm 74 configured to adjustably couple the press wheel 72 to the frame 50. For example, one end of the support arm 74 may be pivotably coupled to the press wheel 72, while an opposed end of the support arm 74 may be pivotably coupled to the chassis arm 68, which is, in turn, coupled to the frame 50. However, it should be appreciated that, in alternative embodiments, the press wheel 72 may be coupled to the frame 50 in any other suitable manner.

Furthermore, in one embodiment, a residue removal device 76 may be positioned at the forward end of the row unit 44 relative to the direction of travel 14. In this regard, the residue removal device 76 may be configured to break up and/or sweep away residue, dirt clods, and/or the like from the path of the row unit 44 before the furrow is formed in the soil. For example, in one embodiment, the residue removal device 76 may include one or more residue removal wheels 78, with each wheel 78 having a plurality of tillage points or fingers 80. As such, the wheel(s) 78 may be configured to roll relative to the soil as the implement 12 is moved across the field such that the fingers 80 break up and/or sweep away residue and dirt clods. Additionally, the residue removal device 76 may include a support arm 82 configured to adjustably couple the residue removal wheel(s) 50 to the frame 50. For example, one end of the support arm 82 may be pivotably coupled to the wheel(s) 78, while an opposed end of the support arm 82 may be pivotably coupled to the frame 50. However, it should be appreciated that, in alternative embodiments, the residue removal wheel(s) 78 may be coupled to the frame 50 in any other suitable manner. Furthermore, although only one residue removal wheel 78 is shown in FIG. 3, it should be appreciated that, in alternative embodiments, the residue removal device 76 may include any other suitable number of residue removal wheels 78. For example, in one embodiment, the residue removal device 76 may include a pair of residue removal wheels 78.

In several embodiments, the row unit 44 may include one or more actuators 104. Specifically, each actuator 104 may be configured to adjust to the position of a ground engaging tool of the row unit 44 relative to the frame 50. For example, in one embodiment, a first end of each actuator 104 (e.g., a rod of each actuator 104) may be coupled to an arm on which the ground engaging component is mounted, while a second end of each actuator 104 (e.g., the cylinder of each actuator 104) may be coupled to the chassis arm 68 or a bracket 84, which are, in turn, coupled to the frame 50. The rod of each actuator 104 may be configured to extend and/or retract relative to the corresponding cylinder to adjust the downforce being applied to and/or the penetration depth of the associated ground engaging component. In one embodiment, the actuator(s) 104 corresponds to a fluid-driven actuator(s), such as a hydraulic or pneumatic cylinder(s). However, it should be appreciated that the actuator(s) 104 may correspond to any other suitable type of actuator(s), such as an electric linear actuator(s).

As shown in FIG. 2, the actuator(s) 102 may be configured to adjust the downforce being applied to and/or the penetration depth of any number of ground engaging tools of the row unit 44. Specifically, in several embodiments, the actuator(s) 104 may be configured to adjust the downforce being applied to one or more ground engaging components of the furrow opening assembly 54, the furrow closing assembly 62, the press wheel assembly 70, and/or the residue removal device 76. For instance, as shown in the illustrated embodiment, an actuator 104 may be configured to adjust the downforce being applied to the gauge wheel 56, the closing disc(s) 64, the press wheel 72, and the residue removal wheel(s) 78. Furthermore, in the illustrated embodiment, the actuators 102 may be configured to adjust the penetration depth of the closing disc(s) 66. Alternatively, the actuator(s) 102 may be provided in operative association with any other suitable ground engaging components of the row unit 18, such as the disc opener(s) 34. In addition, in one embodiment, an actuator 104 may be coupled between the one of the links 52 and a bracket 86, which is, in turn, coupled to the toolbar 28. In such embodiment, the actuator 104 may be configured to adjust the downforce being applied to the entire row unit 44.

In accordance with aspects of the present subject matter, the row unit 44 may include one or more operating parameter sensors 106 configured to monitor an operating parameter associated with the operation of the implement 12 as it is towed across the field. In general, the monitored parameter may correspond to any suitable operating parameter associated with the implement 12 that provides an indication of a condition of the field across which the implement 12 is being traversed. Specifically, in several embodiments, the operating parameter may provide an indication of the seedbed quality of the field (e.g., as defined by the field roughness). In such embodiments, the monitored operating parameter may, for example, correspond to a ground contact metric or percentage indicative of whether a ground engaging tool of the row unit 44 (e.g., the gauge wheel 56, the disc opener(s) 58, the closing discs 64, the press wheel 72, and/or the residue removal wheel(s) 78) remains in contact with the ground as the implement 12 is towed across the field. In such instance, the ground contact percentage (i.e., the percentage of the time the tool/component of the row unit 44 actually remains in contact with the ground) may generally vary as a function of the seedbed quality of the field. For example, the ground contact percentage will generally decrease with increases in the field roughness (and, thus, decreases in the seedbed quality) and will generally increase with decreases in the field roughness (and, thus, increases in the seedbed quality). In other embodiments, the monitored operating parameter may correspond to any other suitable operating parameter of the implement 12 that provides an indication of the seedbed quality or any other suitable field condition.

In several embodiments, the monitored operating parameter may vary as a function of both the travel speed of the implement 12 and the associated field condition(s). For instance, when the operating parameter corresponds to a ground contact metric or percentage, the ground contact percentage may generally vary as a function of both the travel speed of the implement 12 and the seedbed quality of the field. Specifically, for a given field roughness or seedbed quality, the ground contact percentage will generally decrease with increases in the travel speed and will generally increase with decreases in the travel speed. Similarly, for a given travel speed, the ground contact percentage will generally decrease with increases in the field roughness (and, thus, decreases in the seedbed quality) and will generally increase with decreases in the field roughness (and, thus, increases in the seedbed quality). Thus, as the seedbed quality varies across the field, it may be necessary to adjust the travel speed of the implement 12 in order to maintain the desired ground contact percentage.

It should be appreciated that, when the monitored operating parameter corresponds to a ground contact metric or percentage, the operating parameter sensor(s) 106 may generally correspond to any suitable sensor configured to provide data that is directly or indirectly associated with the ground contact for the implement 12 and, thus, directly or indirectly indicative of the associated field condition (e.g., seedbed quality). For instance, in one embodiment, the operating parameter sensor(s) 106 may correspond to a movement sensor (e.g., an accelerometer) configured to monitor the movement of one or more components of the row unit 44, which may be indicative of the ground contact percentage for such component(s) and, thus, the seedbed quality. Specifically, as the field roughness varies while the implement 12 is traveling at a given speed, the movement or rate of movement of one or more components of the row unit 44 relative to the ground may similarly vary, thereby causing changes in the ground contact percentage. Alternatively, the operating parameter sensor(s) 106 may correspond to any other suitable sensor configured to provide data that is directly or indirectly indicative of the ground contact (and, thus, the associated field condition), such as a position sensor configured to monitor the relative position of one or more components of the implement 12 or a load sensor/load cell configured to monitor the contact force between a ground engaging tool(s) of the implement 12 and the soil. For instance, as the field roughness varies while the implement is traveling at a given speed, the relative position of one or more components of the implement 12 may similarly vary, thereby causing changes in the ground contact percentage. Moreover, it should be appreciated that, in embodiments in which the monitored field-related parameter corresponds to any other suitable operating parameter of the implement that provides an indication of an associated field condition, the operating parameter sensor(s) 106 may similarly correspond to any suitable sensor configured to provide data that is directly or indirectly indicative of such parameter.

Furthermore, as shown in FIG. 3, the operating parameter sensor(s) 106 may be provided in operative association with any number of components of the row unit 44. Specifically, in several embodiments, the operating parameter sensor(s) 106 may be provided in operative association with one or more components of the furrow opening assembly 54, the furrow closing assembly 62, the press wheel assembly 70, and/or the residue removal device 76. For instance, as shown in the illustrated embodiment, an operating parameter sensor 106 may be provided in operative association with the support arm 60 of the furrow opening assembly 54, the support arm 66 of the furrow closing assembly 62, the support arm 74 of the press wheel assembly 70, and the support arm 82 of the residue removal device 76. Additionally, as shown, an operating parameter sensor 106 may be provided in operative association with the chassis assembly 68, the frame 50, and/or the link(s) 52. Alternatively, the operating parameter sensor(s) 106 may be provided in operative association with any other suitable components of the row unit 44, such as the frame 50 or the links 52. Furthermore, the operating parameter sensor(s) 106 may be provided in operative association with any other components of the implement 12 and any suitable components of the vehicle 10.

It should be appreciated that the configuration of the agricultural vehicle/implement 10/12 described above and shown in FIGS. 1-3 is provided only to place the present subject matter in an exemplary field of use. Thus, it should be appreciated that the present subject matter may be readily adaptable to any manner of machine configuration.

Figure 4:
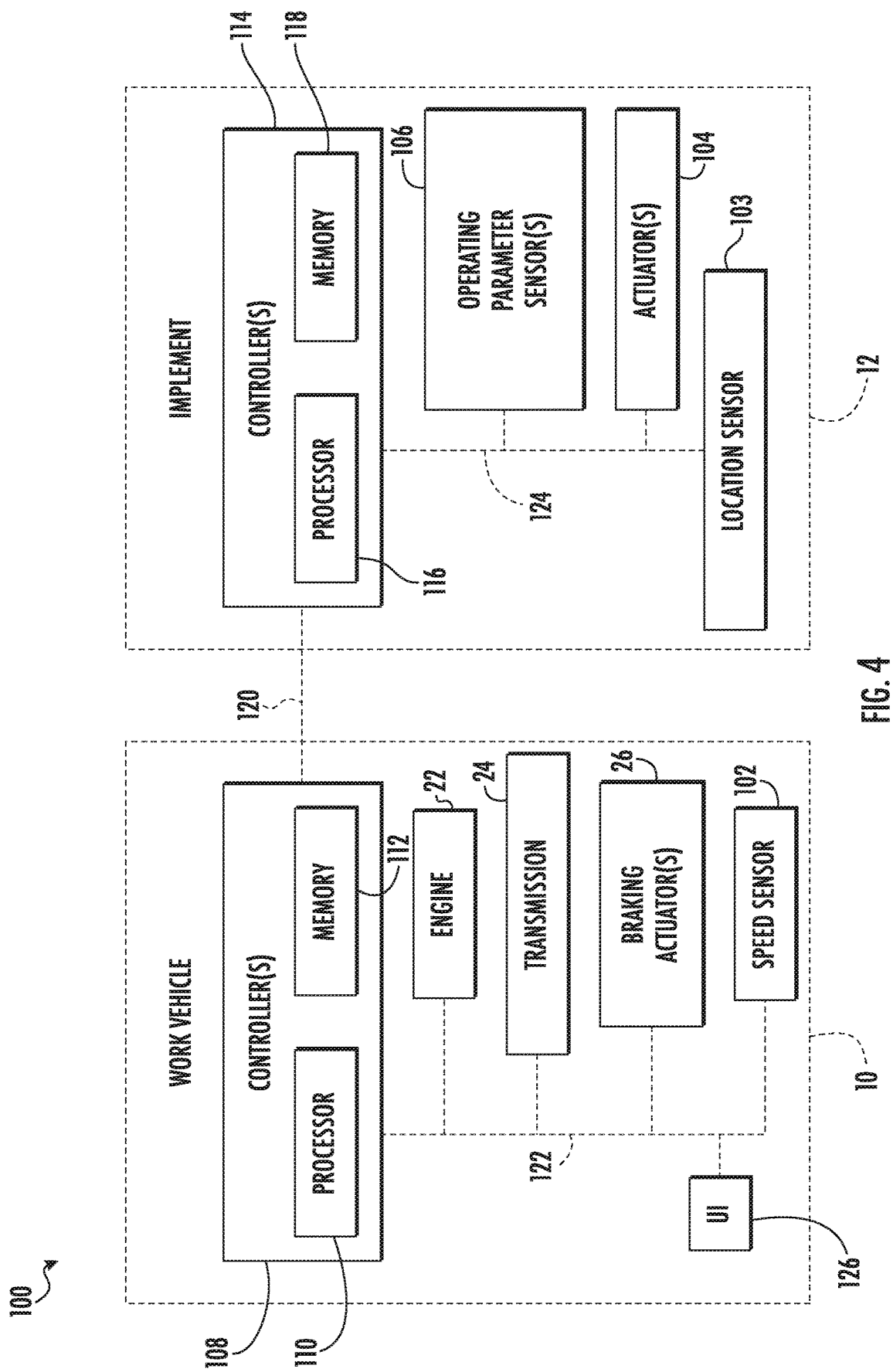
FIG. 4 illustrates a schematic view of one embodiment of a system for pre-emptively adjusting machine parameters based on predicted field conditions in accordance with aspects of the present subject matter.

Referring now to FIG. 4, a schematic view of one embodiment of a system 100 for pre-emptively adjusting machine parameters based on predicted field conditions is illustrated in accordance with aspects of the present subject matter. In general, the system 100 will be described herein with reference to the agricultural vehicle/implement 10/12 described above with reference to FIGS. 1-3. However, it should be appreciated by those of ordinary skill in the art that the disclosed system 100 may generally be utilized with agricultural machines having any other suitable machine configuration. Additionally, it should be appreciated that communicative links or electrical couplings of the system 100 shown in FIG. 4 are indicated by dashed lines.

As shown in FIG. 4, the system 100 may include one or more vehicle-based controllers 108 positioned on and/or within or otherwise associated with the vehicle 10. In general, the vehicle controller(s) 108 may comprise any suitable processor-based device known in the art, such as a computing device or any suitable combination of computing devices. Thus, in several embodiments, the vehicle controller(s) 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the vehicle controller(s) 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the vehicle controller(s) 108 to perform various computer-implemented functions, such as one or more aspects of the method 20X) described below with reference to FIG. 6.

It should be appreciated that the vehicle controller(s) 108 may correspond to an existing controller(s) of the vehicle 10, itself, or the controller(s) 108 may correspond to a separate processing device. For instance, in one embodiment, the vehicle controller(s) 108 may form all or part of a separate plug-in module that may be installed in association with the vehicle 10 to allow for the disclosed systems and methods to be implemented without requiring additional software to be uploaded onto existing control devices of the vehicle 10. It should also be appreciated that the functions of the vehicle controller(s) 108 may be performed by a single processor-based device or may be distributed across any number of processor-based devices, in which instance such devices may be considered to form part of the controller(s) 108. For instance, the functions of the vehicle controller(s) 108 may be distributed across multiple application-specific controllers, such as an engine controller, a transmission controller, a brake system controller, a navigation controller, and/or the like.

Moreover, the system 100 may include one or more implement-based controllers 114 positioned on and/or within or otherwise associated with the implement 12. In general, the implement controller(s) 114 may comprise any suitable processor-based device known in the art, such as a computing device or any suitable combination of computing devices. Thus, in several embodiments, the implement controller(s) 114 may include one or more processor(s) 116 and associated memory device(s) 118 configured to perform a variety of computer-implemented functions. Such memory device(s) 118 may generally be configured to store suitable computer-readable instructions that, when implemented by the processor(s) 116, configure the implement controller(s) 114 to perform various computer-implemented functions, such as one or more aspects of the method 200 described below with reference to FIG. 6.

It should be appreciated that the implement controller(s) 114 may correspond to an existing controller(s) of the implement 12, itself, or the controller(s) 114 may correspond to a separate processing device(s). For instance, in one embodiment, the implement controller(s) 114 may form all or part of a separate plug-in module that may be installed in association with the implement 12 to allow for the disclosed systems and methods to be implemented without requiring additional software to be uploaded onto existing control devices of the implement 12. It should also be appreciated that the functions of the implement controller(s) 114 may be performed by a single processor-based device or may be distributed across any number of processor-based devices, in which instance such devices may be considered to form part of the implement controller(s) 114.

In addition, the controllers 108, 114 may also include various other suitable components, such as a communications circuit or module, a network interface, one or more input/output channels, a data/control bus and/or the like, to allow each controller 108, 114 to be communicatively coupled to the other controller and/or to any of the various other system components described herein (e.g., the sensors 102, 103, 106 and/or components 22, 24, 26, 104). For instance, as shown in FIG. 4, a communicative link or interface 120 (e.g., a data bus) may be provided between the vehicle controller(s) 108 and the implement controller(s) 114 to allow the controllers 108, 114 to communicate with each other via any suitable communications protocol. Specifically, in one embodiment, an ISOBUS Class 3 (ISO 11763) interface may be utilized to provide a standard communications protocol between the controllers 108, 114. Alternatively, a proprietary communications protocol may be utilized for communications between the vehicle controller(s) 108 and the implement controller(s) 114. Moreover, as shown in FIG. 4, in one embodiment, a communicative link or interface 122 (e.g., a data bus) may be provided between the vehicle controller(s) 108 and the system components 22, 24, 26, 102 of the vehicle 10 to allow the controller(s) 108 to communicate with such components via any suitable communications protocol (e.g., CANBUS). Additionally, in one embodiment, a communicative link or interface 124 (e.g., a data bus) may be provided between the implement controller(s) 114 and the system components 103, 104, 106 of the implement 12 to allow the controller(s) 114 to communicate with such components via any suitable communications protocol (e.g., CANBUS).

Furthermore, in one embodiment, the system 100) may also include a user interface 126. More specifically, the user interface 126 may be configured to provide feedback to the operator of the vehicle/implement 10/12. As such, the user interface 126 may include one or more feedback devices (not shown), such as display screens, speakers, warning lights, and/or the like, which are configured to communicate such feedback. In addition, some embodiments of the user interface 126 may include one or more input devices (not shown), such as touchscreens, keypads, touchpads, knobs, buttons, sliders, switches, mice, microphones, and/or the like, which are configured to receive user inputs from the operator. In one embodiment, the user interface 126 may be positioned within a cab of the vehicle 10. However, in alternative embodiments, the user interface 126 may have any suitable configuration and/or be positioned in any other suitable location.

In several embodiments, the vehicle and/or implement controller(s) 108, 114 may be configured to monitor an operating parameter associated with the implement 12, such as a ground contact metric associated with the ground engaging tools of the implement 12, as the implement 12 makes a first pass across a field. More specifically, in one embodiment, as the vehicle/implement 10/12 makes the first pass to perform an agricultural operation (e.g., a seed planting operation) on a first swath of the field, the implement controller(s) 114 may be configured to receive sensor data from the sensor(s) 106 (e.g., via the communicative link 124). Thereafter, the implement controller(s) 114 may be configured to process/analyze the sensor data to determine the ground contact metric of the implement 12. For instance, the implement controller(s) 114 may include a look-up table, suitable mathematical formula, and/or algorithms stored within its memory 118 that correlates the received sensor data to the ground contact metric. The monitored ground contact metric data may then be stored within the memory 118 of the implement controller(s) 114 and/or transmitted to the vehicle controller(s) 108. In an alternative embodiment, the sensor data may be transmitted from the implement controller(s) 114 to the vehicle controller(s) 108 to allow the vehicle controller(s) 108 to process/analyze the sensor data to determine the ground contact metric. In such an embodiment, the monitored ground contact metric data may then be stored within the memory 112 of the vehicle controller(s) 108 and/or transmitted to the implement controller(s) 114. In a further embodiment, the vehicle controller(s) 108 may receive the sensor data directly from the operating parameter sensor(s) 106. It should be appreciated that, in other embodiments, the vehicle/implement controller(s) 108, 114 may be configured to monitor any other suitable operating parameter associated with the vehicle 10 and/or the implement 12 that provides an indication of the condition of the field based on the data received from the sensor(s) 106. However, for purposes of discussion, the monitored operating parameter will generally be described herein as a ground contact metric for the implement 12.

It should be appreciated that the detected ground contact metric may be associated with any number of the ground engaging tools of the implement 12. For example, in certain instances, the sensor data from the operating parameter sensors 106 associated with the row units 44 positioned adjacent to the first and second ends 32, 34 of the implement 12 (e.g., the third of the rows units 44 positioned adjacent to the first end 32 and the third of the rows units 44 positioned adjacent to the second end 32) may result in a low ground contact metric. In such instances, the implement controller(s) 114 and/or vehicle controller(s) 108 may be configured to process/analyze the sensor data the centrally-located row units 44 of the implement 12 (e.g., the third of the row units 44 positioned adjacent to a longitudinal centerline of the implement 12) to determine the ground contact metric of the implement 12. However, in alternative embodiments, sensor data from the operational parameter sensor(s) 106 on any other suitable number of row units 44 may be used to determine the ground contact metric of the implement 12, such as one row unit 44, half of the row units 44, or all of the row units 44.

As the vehicle/implement 10/12 makes the first pass along the first swath, the vehicle and/or implement controller(s) 108, 114 may be configured to initiate active adjustments of the travel speed of the vehicle/implement 10/12 based on the monitored ground contact metric. In general, such travel speed adjustments may account for localized variations in the field conditions (e.g., seedbed roughness or quality) along the first swath of the field as determined by the monitored ground contact metric. Specifically, in one embodiment, as the vehicle/implement 10/12 makes the first pass across the field to perform the agricultural operation on the first swath, the implement controller(s) 114 may be configured to monitor the ground contact metric relative to a predetermined ground contact metric range and initiate active adjustments of the travel speed of the vehicle/implement 10/12 when the monitored ground contact metric falls outside of the range. In such instances, the implement controller(s) 114 may be configured to transmit a request to the vehicle controller(s) 108 (e.g., via the communicative link 120) instructing the vehicle controller(s) 108 to control the operation of the relevant vehicle component(s) (e.g., engine 22, the transmission 24, and/or the braking actuator(s) 26) in a manner that adjusts the travel speed of the vehicle/implement 10/12. For example, when the monitored ground contact metric falls below a minimum ground contact metric value of the range (thereby indicating that the desired amount of ground contact is not being maintained), the implement controller(s) 114 may instruct the vehicle controller(s) 108 to control the operation of the relevant vehicle component(s) in a manner that reduces the travel speed of the vehicle/implement 10/12 until the monitored ground contact metric is again within the predetermined range. Conversely, when the monitored operating parameter exceeds a maximum ground contact metric value of the range (thereby indicating that the implement 12 can potentially be operated at a higher speed without inhibiting the performance of the machine), the implement controller(s) 114 may instruct the vehicle controller(s) 108 to control the operation of the relevant vehicle component(s) in a manner that increases the travel speed of the vehicle/implement 10/12 such that the monitored ground contact metric is decreased until the ground contact metric is again within the predetermined range. Additionally, in one embodiment, the operator may set minimum and/or maximum travel speed limits for the vehicle/implement 10/12. In such embodiment, the vehicle and/or implement controller(s) 108, 114 may be configured to initiate active adjustments of the travel speed of the vehicle/implement 10/12 based on the monitored ground contact metric so long as the travel speed remains above the minimum travel speed limit and/or below the maximum travel speed limit. Alternatively, as the vehicle/ implement 10/12 makes the first pass, the vehicle controller(s) 108 may, itself, be configured to monitor the ground contact metric relative to the predetermined ground contact metric range and initiate active adjustments to the travel speed of the vehicle/implement 10/12 when the monitored ground contact metric fall outside of the range. In yet another embodiment, the various control actions/functions may be divided or distributed across the controllers 108, 114.

Furthermore, when the monitored ground contact metric falls outside of the predetermined range, the vehicle and/or implement controller(s) 108, 114 may be configured to initiate active adjustments of one or more components of the implement 12. Specifically, in one embodiment, the implement controller(s) 114 may be configured to actively control the actuator(s) 104 of the implement 12 in a manner that adjusts the downforce being applied to the associated ground engaging tools. For example, when the monitored ground contact metric falls below the minimum ground contact metric value of the range, the implement controller(s) 114 may control the operation of the actuator(s) 104 (e.g., via the communicative link 124) in a manner that increases the downforce being applied to and/or the penetration depth of the associated components of the implement 12 to compensate for the decreased contact between the ground engaging tools and the soil. Additionally, in several embodiments, the operator may set minimum and/or maximum operating parameter limits for the actuator(s) 104. For example, in one embodiment, the vehicle and/or implement controller(s) 108, 114 may be configured to initiate active adjustments of the downforce being applied to the associated ground engaging tools based on the monitored ground contact metric so long as the downforce remains above a minimum downforce limit and/or below the maximum downforce limit. Alternatively, the vehicle controller(s) 108 may be configured to transmit a request to the implement controller(s) 114 (e.g., via the communicative link 120) instructing the implement controller(s) 114 to control the operation of the actuator(s) 104 to adjust the downforce being applied to and/or penetration depth of the ground engaging tools. In yet another embodiment, the various control actions/functions may be divided or distributed across the controllers 108, 114.

It should be appreciated that, in several embodiments, the predetermined ground contact metric range may be set to maintain a desired amount of contact between the ground engaging tools of the implement 12 and the soil within the field, while still maximizing the efficiency of the agricultural operation. For example, as indicated above, the monitored ground contact metric may be indicative of the amount or percentage of the time that one or more ground engaging tools of the row unit 44 (e.g., the gauge wheel 56, the disc opener(s) 58, the closing discs 64, the press wheel 72, and/or the residue removal wheel(s) 78) remain in contact with the ground as the implement 12 is towed across the field. In such instances, the minimum ground contact metric value of the range may correspond to the minimum amount of time that the ground engaging tool(s) can remain in contact with the soil and still adequately perform the agricultural operation. Conversely, the maximum ground contact metric value of the range may correspond to an amount of contact between the ground engaging tool(s) and the soil above which further gains in agricultural operation quality are offset the value of moving the vehicle/implement 10/12 at a feaster travel speed to reach the desired operational efficiency. That is, when the ground contact metric is above the maximum ground contact metric value, the travel speed of the vehicle/implement 10/12 may be increased to improve agricultural operation efficiency since the agricultural operation quality is maximized. However, the minimum and maximum values of the ground contact metric value range may correspond to any other suitable values.

Moreover, the vehicle and/or implement controller(s) 108, 114 may be configured to monitor the travel speed of the vehicle/implement 10/12 as it makes the first pass along the first swath. Specifically, in one embodiment, as the vehicle/implement 10/12 makes the first pass along the first swath, the vehicle controller(s) 108 may be configured to receive sensor data from the speed sensor 102 via the communicative link 122. Thereafter, the vehicle controller(s) 108 may be configured to process/analyze the sensor data to determine the travel speed of vehicle/implement 10/12. For instance, the vehicle controller(s) 108 may include a look-up table, suitable mathematical formula, and/or algorithms stored within its/their memory 112 that correlates the received sensor data to the travel speed. The monitored travel speed data may then be stored within the memory 112 of the vehicle controller(s) 108 and/or transmitted to the implement controller(s) 114. In an alternative embodiment, the sensor data may be transmitted from the vehicle controller(s) 108 to the implement controller(s) 114 to allow the implement controller(s) 114 to process/analyze the sensor data to determine the travel speed of the vehicle/implement 10/12. In such an embodiment, the travel speed data may then be stored within the memory 118 of the implement controller(s) 114 and/or transmitted to the vehicle controller(s) 108.

As the vehicle/implement 10/12 makes the first pass, the vehicle and/or implement controller(s) 108, 114 may be configured to record the travel speeds of the vehicle/implement 10/12 at which the monitored ground contact metric is maintained within the predetermined range along the first swath. As indicated, in several embodiments, the implement controller(s) 114 may be configured to monitor the determined ground contact metric relative to the predetermined ground contact metric range. When the monitored ground contact metric is within the range, the implement controller(s) 114 may be configured to record the current travel speed of the vehicle/implement 10/12. However, when the monitored ground contact metric falls outside of the range, the implement controller(s) 114 may be configured to ignore the current travel speed of the vehicle/implement 10/12. As indicated above, in such instances, the vehicle and/or implement controller(s) 108, 114 may be configured to initiate active adjustments of the travel speed of the vehicle/implement 10/12 until the monitored ground contact metric is within the predetermined range. Once the monitored ground contact metric is back within the predetermined range, the implement controller(s) 114 may be configured to continue recording the current travel speed of the vehicle/implement 10/12. That is, the implement controller(s) 114 may be configured to ignore the current travel speed of the vehicle/implement 10/12 while the active adjustments of the travel speed are being made. Alternatively, the vehicle controller(s) 108 may be configured to record the travel speeds of the vehicle/implement 10/12 at which the monitored ground contact metric is maintained within the predetermined range.

Additionally, in several embodiments, the vehicle and/or implement controller(s) 108, 114 may be configured to geo-locate the recorded travel speed data within the field. More specifically, in one embodiment, as the vehicle/implement 10/12 makes the first pass along the first swath, the implement controller(s) 114 may be configured to receive location data (e.g., coordinates) from the location sensor 103

(e.g., via the communicative link 124). Thereafter, based on the known dimensional configuration and/or relative positioning between the implement 12 and the location sensor 103, the implement controller(s) 114 may be configured to geo-locate each recorded travel speed measurement of the vehicle/implement 10/12 within the first swath of the field. For example, in one embodiment, the coordinates derived from the location sensor 103 and the travel speed measurements derived from the speed sensor 102 may both be time-stamped. In such an embodiment, the time-stamped data may allow the travel speed measurements to be matched or correlated to a corresponding set of location coordinates received or derived from the location sensor 103. Alternatively, the vehicle controller(s) 108 may be configured to receive the location the location sensor 103 or the implement controller(s) 114 and geo-locate the travel speed measurements within the field. In yet another embodiment, the various functions may be divided or distributed across the controllers 108, 114.

In accordance with aspects of the present subject matter, the vehicle and/or implement controller(s) 108, 114 may be configured to generate a field map of the first swath of the field based on the recorded travel speeds. Specifically, in several embodiments, the field map may include a plurality of efficiency zones across the first swath of the field. Each efficiency zone may, in turn, be associated with or otherwise indicative of the recorded travel speeds of the vehicle/ implement 10/12 at which the monitored ground contact metric was maintained within the predetermined range for that portion of the first swath. For example, in one embodiment, each efficiency zone may be indicative of a range of travel speeds at which the monitored ground contact metric was maintained within the range. However, in other embodiments, each efficiency zone may be indicative of a single travel speed value, such as the maximum travel speed value at which the monitored ground contact metric is maintained within the range.

Furthermore, in several embodiments, the vehicle and/or implement controller(s) 108, 114 may be configured to associate the portions of the first swath in which the current travel speed is ignored with the next recorded travel speed. As indicated above, the vehicle and/or implement controller(s) 108, 114 may be configured to ignore the current travel speed of the vehicle/implement 10/12 when the monitored ground contact metric falls outside of the predetermined range. As such, there may be portions of the first swath to which no recorded travel speed has been correlated. Once the monitored ground contact metric is returned the predetermined range (e.g., via active adjustments of the travel speed as described above), the vehicle and/or implement controller(s) 108, 114 may be configured to associate the first recorded travel speed with the preceding portion of the first swath in which the travel speed was ignored. More specifically, the first travel speed recorded once the monitored ground contact metric is returned the predetermined range may be associated with the portion of the first swath extending rearward (e.g., opposite of the direction of travel of the vehicle/implement 10/12) from the current location of the vehicle/implement 10/12 to the position within the first swath at which the monitored ground contact metric first fell outside of the range. In this regard, each efficiency zone may extend from the position within the first swath at which the monitored ground contact metric first falls outside of the range (e.g., the end of the preceding efficiency zone) through the portions of the first swath in which the monitored ground contact metric is within the range to the position within the first swath at which the monitored ground contact metric first falls outside of the range again.

Figure 5:
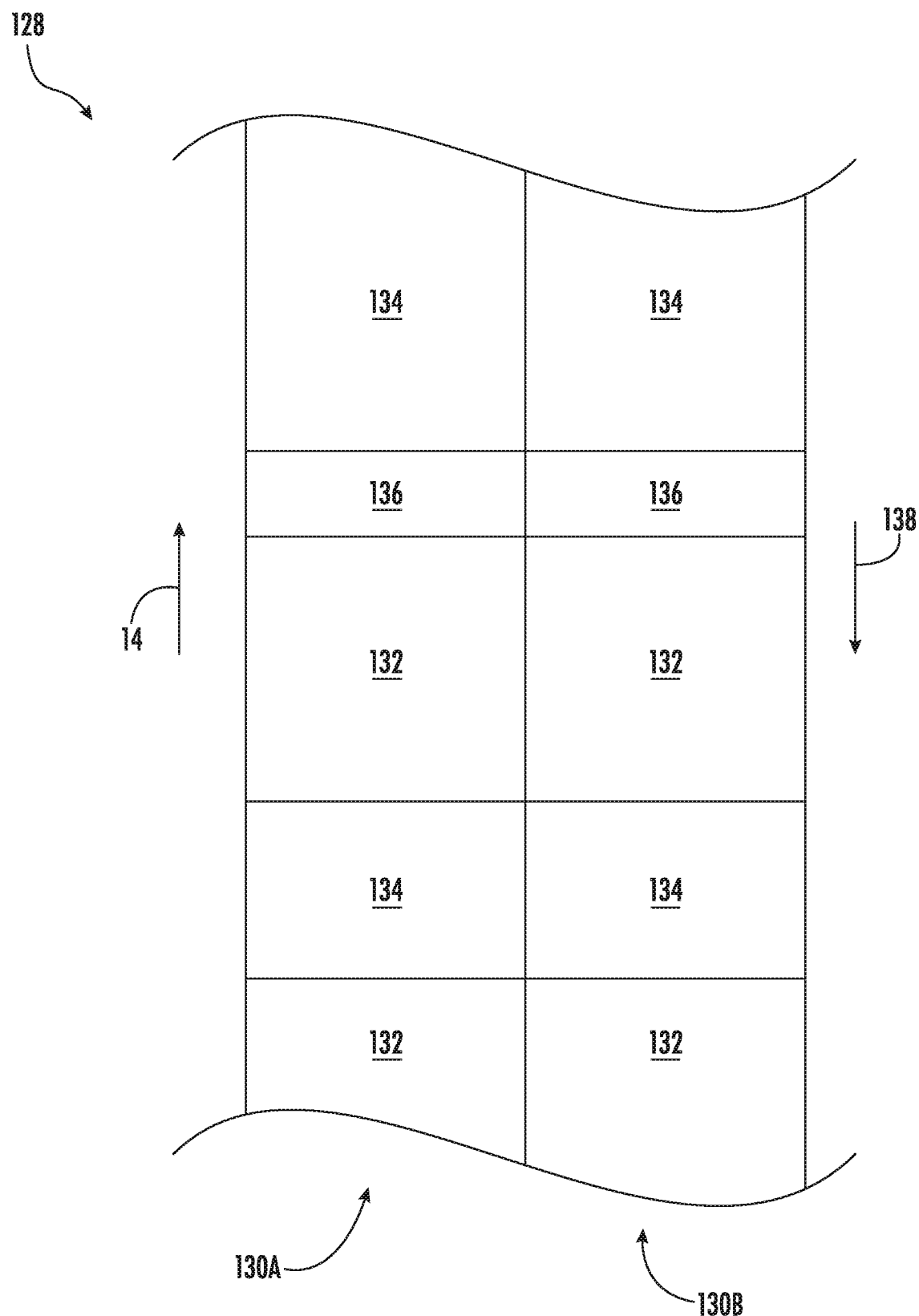
FIG. 5 illustrates an example field map of a field in accordance with aspects of the present subject matter, particularly illustrating variations in an efficiency parameter of an agricultural machine across the field.

For example, FIG. 5 illustrates a graphical view of a portion of an example field map 128 of a first swath 130A of the field based on the recorded travel speeds of the vehicle/implement 10/12 as the vehicle/implement 10/12 makes the first pass. Specifically, the field map 128 includes a plurality of efficiency zones along the first swath 130A such that localized variations in the travel speed(s) of the vehicle/implement 10/12 at which monitored ground contact metric is maintained within the predetermined range may be identified and mapped to a corresponding location within the field. As such, the field map 128 may identify variations in the seedbed quality along the first swath 130 based on the efficiency zones. For instance, as shown in FIG. 5, the mapped first swath 130A includes two sections or zones 132 along the first swath 130A in which the vehicle/implement 10/12 was able to travel at relatively high speeds while still maintaining the ground contact metric within the desired range (e.g., due to high seedbed quality), two sections or zones 134 along the first swath 130A in which the vehicle/ implement 10/12 was able to travel at moderate speeds while still maintaining the ground contact metric within the desired range (e.g., due to moderate seedbed quality), and a single section or zone 136 along the first swath 130A was able to travel at relatively low speeds while still maintaining the ground contact metric within the desired range (e.g., due to low seedbed quality). As will be described below, based on the field map 128, the operation of the vehicle 10 and/or the implement 12 may be actively adjusted as the vehicle/ implement 10/12 makes a subsequent second pass across an adjacent second swath 130B of the field to account for the predicted localized variations in the field conditions of the second swath 130B, such as by increasing the travel speed of the vehicle/implement 10/12 when the implement 12 approaches the high travel speed range zones 132 and decreasing the speed of the vehicle/implement 10/12 when the implement 12 approaches through the low travel speed range zone 136.

It should be appreciated that, as used herein, a "field map" may generally correspond to any suitable dataset that correlates data to various locations within a field. Thus, for example, a field map may simply correspond to a data table that correlates the travel speed(s) of the vehicle/implement 10/12 at which the ground contact metric is maintained within the predetermined range to various locations along the swath being mapped. Alternatively, a field map may correspond to a more complex data structure, such as a geospatial numerical model that can be used to identify detected variations in the travel speed(s) of the vehicle/ implement 10/12 at which the ground contact metric is maintained within the predetermined range and classif, such variations into geographic zones or groups. In one embodiment, the vehicle and/or implement controller(s) 108, 114 may be configured to generate a graphically displayed map or visual indicator similar to that shown in FIG. 5 for display to the operator of the vehicle/implement 10/12 (e.g., via the user interface 126).

In accordance with aspects of the present subject matter, the vehicle and/or implement controller(s) 108, 114 may be configured to determine predicted efficiency zones for the second swath 130B within the field based on the identified efficiency zones of the first swath 130A within the field map 128. In general, field conditions (e.g., seedbed quality or roughness) may be similar to or the same in adjacent swaths of the field. In this regard, the travel speed(s) of the vehicle/implement 10/12 at which the monitored ground contact metric is maintained within the predetermined range for the first swath 130A is also likely to maintain the ground contact metric within the predetermined range as the vehicle/implement 10/12 makes the second pass along the second swath. As such, in several embodiments, each predicted efficiency zones of the second swath 130B may be associated with the same recorded travel speed(s) as the corresponding efficiency zone of the first swath 130A. For example, in one embodiment, the vehicle and/or implement controller(s) 108, 114 may be configured to project the identified quality zones for the first swath 130A onto the second swath 130B within the field map 128 to determine predicted efficiency zones for the second swath 130B. Thus, the predicted efficiency zones may occupy the same portion of the second swath 130B that the corresponding identified efficiency zone occupies of the first swath 130A. As shown in FIG. 5, the vehicle and/or implement controller(s) 108, 114 may project the two high travel speed efficiency zones 132, two moderate travel speed efficiency zones 134, and the single low travel speed efficiency zone 136 of the first swath 130A onto corresponding locations within the second swath 130B. However, in other embodiments, the vehicle and/or implement controller(s) 108, 114 may be configured to determine predicted efficiency zones for the second swath 130B in any other suitable manner. For example, in such embodiments, the vehicle and/or implement controller(s) 108, 114 may be configured to apply a correction factor based on the likelihood of changes within field conditions between the first and second swaths 130A, 130B to the identified efficiency zones of the first swath 130A when determining the predicted efficiency zones the second swath 130B.

Furthermore, in several embodiments, the predicted efficiency zones for a given swath of the field may be determined based on the identified efficiency zones of a plurality of previously-traversed swaths of the field. Specifically, in one embodiment, the vehicle and/or implement controller(s) 108, 114 may be configured to determine the predicted efficiency zones for the given swath based on the identified efficiency zones of the previous two swaths of the field traversed by the vehicle/implement 10/12. For example, the vehicle and/or implement controller(s) 108, 114 may be configured to analyze (e.g., statistically analyze) the travel speeds and/or locations associated with identified efficiency zones of the previous two swaths to determine the travel speeds and/or locations of the predicted efficiency zones along the second swath. However, in alternative embodiments, the predicted efficiency zones for a given swath of the field may be determined based on the identified efficiency zones of any other suitable number of previously-traversed swaths of the field, such as one previously-traversed swath of the field or three or more previously-traversed swaths of the field.

Referring back to FIG. 4, in several embodiments, the vehicle and/or implement controller(s) 108, 114 may be configured to pre-emptively initiate adjustments of the travel speed of the vehicle/implement 10/12 as it makes a second pass across the field. In several embodiments, as the vehicle/implement 10/12 makes a subsequent second pass across the field to perform the agricultural operation (e.g., the seed-planting operation) along an adjacent second swath of the field, the vehicle and/or implement controller(s) 108, 114 may be configured to initiate active adjustments of the travel speed of the vehicle/implement 10/12 on-the-fly based on the predicted efficiency zones of the second swath identified within the associated field map 128. For example, as described above, the vehicle and/or implement controller(s) 108, 114 may be configured to initiate control the operation of the relevant vehicle component(s) (e.g., the engine 22, the transmission 24, and/or the braking actuator(s) 26) to adjust the travel speed of the vehicle/implement 10/12 in the desired manner. The active adjustments may be performed such that the vehicle/implement 10/12 is moving at one of the travel speeds associated with a given efficiency zone when the vehicle/implement 10/12 enters such efficiency zone. In this regard, the travel speed adjustments may account for predicted variations in the seedbed quality of the second swath (e.g., based on efficiency zones identified in the associated field map 128).

As indicated above, in several embodiments, the vehicle and/or implement controller(s) 108, 114 may be configured to actively adjust the operation of the vehicle 10 and/or the implement 12 on-the-fly based on the field map 128 as the vehicle/implement 10/12 make the second pass across the field along the second swath. For instance, in the example field map 128 shown in FIG. 5 in which a plurality of efficiency zones have been mapped along the second swath 130B, the vehicle and/or implement controller(s) 108, 114 may be configured to actively adjust the travel speed of the vehicle/implement 10/12 as the implement 12 transitions between the differing efficiency zones 132, 134, 136 identified within the map 128. For instance, as the vehicle/implement 10/12 travels along the second swath 130B in the travel direction indicated by arrow 138 in FIG. 5, the vehicle/implement 10/12 will transition from a moderate travel speed efficiency zone 134 to a low travel speed efficiency zone 136, followed by a high travel speed efficiency zone 132, another moderate travel speed efficiency zone 134, and then another high travel speed efficiency zone 132. In such instance, as the implement 12 initially transitions from the moderate travel speed efficiency zone 134 to the low travel speed efficiency zone 136, the vehicle and/or implement controller(s) 108, 114 may be configured to actively adjust the operation of the vehicle 10 and/or the implement 12 such that travel speed of the vehicle/implement 10/12 is reduced to correspond to one of the travel speeds associated with the low speed efficiency zone 136 (e.g., the maximum travel speed associated with such zone 136). Thereafter, as the vehicle/implement 10/12 transitions from the low travel speed efficiency zone 136 to the high travel speed efficiency zone 132, the vehicle and/or implement controller(s) 108, 114 may be configured to actively adjust the operation of the vehicle 10 and/or the implement 12 such that travel speed of the vehicle/implement 10/12 is increased to correspond to one of the travel speeds associated with the high speed efficiency zone 132 (e.g., the maximum travel speed associated with such zone 132). Moreover, as the vehicle/implement 10/12 transitions from the high travel speed efficiency zone 132 to the following moderate travel speed efficiency zone 134, the vehicle and/or implement controller(s) 108, 114 may be configured to actively adjust the operation of the vehicle 10 and/or the implement 12 such that travel speed of the vehicle/implement 10/12 is reduced to correspond to one of the travel speeds associated with the moderate travel speed efficiency zone 134 (e.g., the maximum travel speed associated with such zone 134). Such active adjustments may be made, as desired, along the entire length of the second swath 130B based on the determined efficiency zones to account for predicted localized variations in the seedbed quality.

In several embodiments, the pre-emptive travel speed adjustments may be performed immediately before the implement 12 enters a given efficiency zone, such as when the implement 12 is within twenty feet of the given efficiency zone, such as within fifteen feet of the given efficiency zone, within ten feet of the given efficiency zone, and/or within five feet of the given efficiency zone. In another embodiment, the pre-emptive travel speed adjustments may be performed immediately before the implement 12 enters a given efficiency zone when the implement 12 will encounter the given zone within five seconds of continued travel of the implement 12, such as within four seconds, within three seconds, within two seconds, and/or within one second. In a further embodiment, the pre-emptive travel speed adjustments may be performed simultaneously as the implement 12 enters a given efficiency zone.

It should be appreciated that, when the vehicle and/or implement controller(s) 102, 104 are configured to actively adjust the operation of the vehicle 10 and/or the implement 12 based on the predicted efficiency zones, it may be desirable for the vehicle and/or implement controller(s) 108, 114 to apply certain thresholds or control rules when determining how and when to make active adjustments. For instance, if the size of a given efficiency zone within the field map is below a predetermined size threshold, the vehicle and/or implement controller(s) 108, 114 may be configured to ignore the zone and not make any active operational adjustments as the implement 12 passes across such zone. Similarly, the vehicle and/or implement controller(s) 108, 114 may be configured to apply a variation threshold to determine when to make any active operational adjustments. For instance, if the difference between the determined efficiency zones along adjacent sections of the field is below a predetermined variation threshold, the vehicle and/or implement controller(s) 108, 114 may be configured to ignore the difference and apply the same operational setting(s) across the adjacent sections of the field. In such an embodiment, the various zones provided within the field map may, for example, be identified based on a set of predetermined variance thresholds such that the difference in the determined efficiency parameters between differing zones is significant enough to warrant adjusting the operation of the vehicle 10 and/or the implement 12 as the implement 12 transitions between such zones.

It should also be appreciated that, as an alternative to actively adjusting the operation of the vehicle 10 and/or the implement 12 as the vehicle/implement 10/12 are making the second pass across the second swath, the vehicle and/or implement controller(s) 108, 114 may be configured to make a one-time adjustment to one or more of the operating parameters of the vehicle 10 and/or the implement 12 prior to or at the initiation of the second pass to account for the predicted efficiency zones along the second swath. For example, the vehicle and/or implement controller(s) 108, 114 may be configured to statistically analyze the travel speeds associated with the predicted efficiency zones of the second swath to determine an average travel speed along the second swath.

Additionally, it should be appreciated that, in one embodiment, the efficiency zone for a given field swath may be compared to or used in combination with historical or previously obtained data associated with the field being processed. For instance, at the initiation of the agricultural operation being performed within a field, the vehicle and/or implement controller(s) 108, 114 may have a field map stored within its memory that maps previously recorded efficiency zones across the field. In such instance, as the vehicle and/or implement controller(s) 108, 114 determines the efficiency zones based on new sensor data received from the sensor(s) 102, 106 for a given swath, the vehicle and/or implement controller(s) 108, 114 may be configured to update the existing field map with the new data. Alternatively, the vehicle and/or implement controller(s) 108, 114 may compare the new efficiency zone to the previously mapped efficiency zone. Such a comparison may, for example, allow the vehicle and/or implement controller(s) 108, 114 to identify variations between the new efficiency zones and the previously mapped efficiency zones that may be indicative of inaccurate sensor data or faulty sensor operation. In such instance, the vehicle and/or implement controller(s) 108, 114 may be configured to notify the operator of the discrepancies in the data (e.g., via the user interface 126). The operator may then be allowed to choose, for example, whether the previously mapped efficiency zones, the newly derived efficiency zones, and/or a combination of both should be used as the basis for making active adjustments to the operation of the vehicle 10 and/or the implement 12 as the agricultural operation is being performed within the field.

After the pre-emptive active travel speed adjustments, the vehicle and/or implement controller(s) 108, 114 may be configured to continue to monitor the ground contact metric of the implement 12 as the vehicle/implement 10/12 makes the second pass across the second swath of the field. As indicated above, the vehicle and/or implement controller(s) 108, 114 may be configured to process/analyze the sensor data received from the operating parameter sensor(s) 106 to determine the current ground contact metric. Thereafter, as the vehicle/implement 10/12 makes the second pass along the second swath, the vehicle and/or implement controller(s) 108, 114 may be configured to initiate active adjustments of the travel speed of the vehicle/implement 10/12 based on the monitored ground contact metric. For example, when the monitored ground contact metric falls outside of the predetermined ground contact metric range, active adjustments of the travel speed of the vehicle/implement 10/12 may be made to return the monitored ground contact metric to a value within the range. As described above, the vehicle and/or implement controller(s) 108, 114 may be configured to initiate control the operation of the engine 22, the transmission 24, and/or the braking actuator(s) 26 to adjust the travel speed of the vehicle/implement 10/12 in the desired manner.

It should be appreciated that the adjustments to the travel speed of the vehicle/implement 10/12 based on the current ground contact metric may override any pre-emptive adjustments to the travel speed based on the predicted efficiency zones. As indicated above, the field conditions within the first and second swaths may generally be the same or similar. However, in certain instances, the field conditions within the first and second swaths may vary such that the predicted efficiency zones within the second swath do not provide an accurate indication of the travel speeds of the vehicle/implement 10/12 at which the monitored ground contact metric is maintained within the predetermined range. In such instances, the vehicle and/or implement controller(s) 108, 114 may be configured to adjust the operation of the vehicle 10 and/or the implement 12 based on the current monitored ground contact metric and not the predicted efficiency zone.

Referring now to FIG. 6, a flow diagram of one embodiment of a method 200 for pre-emptively adjusting machine parameters based on predicted field conditions is illustrated in accordance with aspects of the present subject matter. In general, the method 200 will be described herein with reference to the agricultural vehicle/implement 10/12 and the system 100 described above with reference to FIGS. 1-5. However, it should be appreciated by those of ordinary skill in the art that the disclosed method 200 may generally implemented with any agricultural machine having any suitable machine configuration and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include monitoring, with a computing device, an operating parameter associated with an agricultural machine as the agricultural machine makes a first pass across a field to perform an agricultural operation along a first swath within the field. For instance, as described above, the vehicle and/or implement controller(s) 108, 114 may be configured to monitor a ground contact metric or any other operating parameter of the implement 12 as the vehicle/implement 10/12 makes a first pass across a field to perform an agricultural operation along a first swath within the field based on sensor data received from one or more operating parameter sensors 106.

Additionally, at (204), the method 200 may include initiating, with the computing device, active adjustments of the travel speed of the agricultural machine based on the monitored operating parameter as the agricultural machine makes the first pass across the field along the first swath. For instance, as described above, the vehicle and/or implement controller(s) 108, 114 may be configured to control the operation of the vehicle 10 and/or the implement 12 in a manner that adjusts the travel speed of the vehicle/implement 10/12 based on the monitored ground contact metric as it makes the first pass.

Moreover, as shown in FIG. 6, at (206), the method 200 may include generating, with the computing device, a field map based on the travel speed of the agricultural machine and the monitored operating parameter that includes a plurality of efficiency zones across the first swath of the field. For instance, as described above, the vehicle and/or implement controller(s) 108, 114 may be configured to generate a field map based on the travel speed of the vehicle/implement 10/12 and the monitored ground contact metric that includes a plurality of efficiency zones.

Furthermore, at (208), the method 200 may include determining, with the computing device, predicted efficiency zones for an adjacent second swath within the field based on the identified efficiency zones of the first swath within the field map. For instance, as described above, the vehicle and/or implement controller(s) 108, 114 may be configured to determine predicted efficiency zones for an adjacent second swath within the field based on the identified efficiency zones of the first swath within the field map.

In addition, as shown in FIG. 6, at (210), the method 200 may include pre-emptively initiating, with the computing device, adjustments of the travel speed of the agricultural machine as the agricultural machine makes a second pass across the field to perform the agricultural operation along each predicted efficiency zone within the adjacent second swath based on one or more recorded travel speeds associated with each predicted efficiency zone. For instance, as described above, the vehicle and/or implement controller(s) 108, 114 may be configured to control the operation of the vehicle 10 and/or the implement 12 in a manner that adjusts the travel speed of the vehicle/implement 10/12 as it makes a second pass along the second swath based on the one or more recorded travel speeds associated with each predicted efficiency zone.

It is to be understood that the steps of the method 200 are performed by the controllers 108, 114 upon loading and executing software code or instructions which are tangibly stored on a tangible computer readable medium, such as on a magnetic medium. e.g., a computer hard drive, an optical medium, e.g., an optical disc, solid-state memory, e.g., flash memory, or other storage media known in the art. Thus, any of the functionality performed by the controllers 108, 114 described herein, such as the method 200, is implemented in software code or instructions which are tangibly stored on a tangible computer readable medium. The controllers 108, 114 load the software code or instructions via a direct interface with the computer readable medium or via a wired and/or wireless network. Upon loading and executing such software code or instructions by the controllers 108, 114, the controllers 108, 114 may perform any of the functionality of the controllers 108, 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for pre-emptively adjusting machine parameters based on predicted field conditions, the method comprising:

monitoring, with a computing device, a ground contact parameter associated with an agricultural machine as the agricultural machine makes a first pass across a field to perform an agricultural operation along a first swath within the field, the ground contact parameter varying as a function of a travel speed of the agricultural machine and a field condition of the field;

initiating, with the computing device, active adjustments of the travel speed of the agricultural machine based on the monitored ground contact parameter as the agricultural machine makes the first pass across the field along the first swath such that contact between a ground engaging tool of the agricultural machine and the ground is maintained;

generating, with the computing device, a field map based on the travel speed of the agricultural machine and the monitored ground contact parameter that includes a plurality of efficiency zones across the first swath of the field, each efficiency zone being associated with one or more recorded travel speeds of the agricultural machine at which the monitored ground contact parameter is maintained within a predetermined range associated with maintaining contact between the ground engaging tool and the ground as the agricultural machine is traversed across such efficiency zone;

determining, with the computing device, predicted efficiency zones for an adjacent second swath within the field based on the efficiency zones of the first swath within the field map, each predicted efficiency zone of the second swath being associated with the same one or more recorded travel speeds of the corresponding efficiency zone of the plurality of efficiency zones of the first swath; and pre-emptively initiating, with the computing device, adjustments of the travel speed of the agricultural machine as the agricultural machine makes a second pass across the field to perform the agricultural operation along each predicted efficiency zone within the adjacent second swath based on the one or more recorded travel speeds associated with each predicted efficiency zone.

2. The method of claim 1, further comprising:

monitoring, with the computing device, the ground contact parameter as the agricultural machine makes the second pass across the field along the second swath; and initiating, with the computing device, active adjustments of the travel speed of the agricultural machine based on the monitored ground contact parameter as the agricultural machine makes the second pass across the field along the second swath such that contact between the ground engaging tool and the ground is maintained.

3. The method of claim 2, wherein the active adjustments of the travel speed of the agricultural machine override the pre-emptive adjustments of the travel speed of the agricultural machine made based on the one or more recorded travel speeds associated with each predicted efficiency zone.

4. The method of claim 1, wherein determining the predicted efficiency zones for the adjacent second swath within the field comprises projecting the efficiency zones for the first swath onto the second adjacent swath within the field map.

5. The method of claim 1, wherein pre-emptively initiating adjustments of the travel speed of the agricultural machine comprises initiating an adjustment of the travel speed of the agricultural machine to a maximum travel speed of the one or more recorded travel speeds associated with a first predicted efficiency zone within the second swath immediately before or simultaneously with the agricultural machine beginning to move through the first predicted efficiency zone as the agricultural machine is making the second pass across the field.

6. The method of claim 1, wherein initiating active adjustments of the travel speed of the agricultural machine comprises initiating, with the computing device, active adjustments of the travel speed of the agricultural machine when the monitored ground contact parameter falls outside of the predetermined range as the agricultural machine makes the first pass across the field along the first swath.

7. The method of claim 1, wherein the ground contact parameter is monitored based on sensor data received from a movement sensor installed on the agricultural machine.

8. The method of claim 1, wherein the agricultural machine comprises a seed-planting implement towed by an agricultural vehicle and the computing device comprises an implement controller of the seed-planting implement, the implement controller being configured to initiate adjustments of the travel speed of the seed-planting implement by transmitting speed requests to a vehicle controller of the agricultural vehicle.

9. The method of claim 1, further comprising:

initiating, with the computing device, display of the field map to an operator of the agricultural machine.

10. A system for pre-emptively adjusting machine parameters based on predicted field conditions, the system comprising:

an agricultural machine configured to perform an agricultural operation on a field as the agricultural machine is moved across the field, the agricultural machine including a ground engaging tool;

a sensor configured to detect a ground contact parameter associated with the agricultural machine, the ground contact parameter varying as a function of a travel speed of the agricultural machine and a field condition of the field; and a controller communicatively coupled to the sensor, the controller configured to:

monitor the ground contact parameter as the agricultural machine makes a first pass across the field to perform the agricultural operation along a first swath within the field based on data received from the sensor;

initiate active adjustments of the travel speed of the agricultural machine based on the monitored ground contact parameter as the agricultural machine makes the first pass across the field along the first swath such that contact between the ground engaging tool and the ground is maintained;

generate a field map based on the travel speed of the agricultural machine and the monitored ground contact parameter that includes a plurality of efficiency zones across the first swath of the field, each efficiency parameter being associated with one or more recorded travel speeds of the agricultural machine at which the monitored ground contact parameter is maintained within a predetermined range associated with maintaining contact between the ground engaging tool and the ground as the agricultural machine is traversed across such efficiency zone;

determine predicted efficiency zones for an adjacent second swath within the field based on the efficiency zones of the first swath within the field map, each predicted efficiency zone of the second swath being associated with the same one or more recorded travel speeds of a corresponding efficiency zone of the plurality of efficiency zones of the first swath; and pre-emptively initiate adjustments of the travel speed of the agricultural machine as the agricultural machine makes a second pass across the field to perform the agricultural operation along each predicted efficiency zone within the adjacent second swath based on the one or more recorded travel speeds associated with each predicted efficiency zone.

11. The system of claim 10, wherein the controller is further configured to monitor the ground contact parameter as the agricultural machine makes the second pass across the field along the second swath based on the received data and initiate active adjustments of the travel speed of the agricultural machine based on the monitored ground contact parameter as the agricultural machine makes the second pass across the field along the second swath such that contact between the ground engaging tool and the ground is maintained.

12. The system of claim 11, wherein the active adjustments of the travel speed of the agricultural machine override the pre-emptive adjustments of the travel speed of the agricultural machine made based on the one or more recorded travel speeds associated with each predicted efficiency zone.

13. The system of claim 10, wherein the controller is further configured to determine the predicted efficiency zones for the adjacent second swath within the field by projecting the efficiency zones for the first swath to the second adjacent swath within the field map.

14. The system of claim 10, wherein the controller is further configured to initiate adjustment of the travel speed of the agricultural machine to a maximum travel speed of the one or more recorded travel speeds associated with a first predicted efficiency zone within the second swath immediately before or simultaneously with the agricultural machine beginning to move through the first predicted efficiency zone as the agricultural machine is making the second pass across the field.

15. The system of claim 10, wherein the controller is further configured to initiate active adjustments of the travel speed of the agricultural machine when the monitored ground contact parameter falls outside of the predetermined range as the agricultural machine makes the first pass across the field along the first swath.

16. The system of claim 10, wherein the sensor comprises a movement sensor installed on the agricultural machine.

17. The system of claim 10, wherein the agricultural machine comprises a seed-planting implement towed by an agricultural vehicle and the controller comprises an implement-based controller installed on the seed-planting implement, the implement-based controller configured to initiate adjustments of the travel speed of the seed-planting implement by transmitting speed requests to a vehicle-based controller of the agricultural vehicle.

18. The system of claim 10, wherein the controller is further configured to initiate display of the field map to an operator of the agricultural machine.

19. A method for pre-emptively adjusting machine parameters based on predicted field conditions, the method comprising:
   monitoring, with an implement controller of a seed-planting implement, an operating parameter associated with the seed-planting implement towed by an agricultural vehicle as the seed-planting implement makes a first pass across a field to perform an agricultural operation along a first swath within the field, the operating parameter varying as a function of a travel speed of the seed-planting implement and a field condition of the field;
   initiating, with the implement controller, active adjustments of the travel speed of the seed-planting implement based on the monitored operating parameter as the seed-planting implement makes the first pass across the field along the first swath by transmitting speed requests to a vehicle controller of the agricultural vehicle;
   generating, with the implement controller, a field map based on the travel speed of the seed-planting implement and the monitored operating parameter that includes a plurality of efficiency zones across the first swath of the field, each efficiency zone being associated with one or more recorded travel speeds of the seed-planting implement at which the monitored operating parameter is maintained within a predetermined range as the seed-planting implement is traversed across such efficiency zone;
   determining, with the implement controller, predicted efficiency zones for an adjacent second swath within the field based on the efficiency zones of the first swath within the field map, each predicted efficiency zone of the second swath being associated with the same one or more recorded travel speeds of the corresponding efficiency zone of the plurality of efficiency zones of the first swath; and
   pre-emptively initiating, with the implement controller, adjustments of the travel speed of the seed-planting implement as the seed-planting implement makes a second pass across the field to perform the agricultural operation along each predicted efficiency zone within the adjacent second swath based on the one or more recorded travel speeds associated with each predicted efficiency zone by transmitting speed requests to the vehicle controller.

* * * * *